April 30, 1968 F. B. HAGEDORN 3,381,280

SUPERCONDUCTIVE MEMORY

Filed April 3, 1964 4 Sheets-Sheet 1

INVENTOR
F. B. HAGEDORN
BY Herbert M. Shapiro
ATTORNEY

April 30, 1968 F. B. HAGEDORN 3,381,280

SUPERCONDUCTIVE MEMORY

Filed April 3, 1964 4 Sheets-Sheet 2

3,381,280

SUPERCONDUCTIVE MEMORY

Fred B. Hagedorn, Berkeley Heights, N.J., assignor to Bell Telephone Laboratories, Incorporated, New York, N.Y., a corporation of New York Filed Apr. 3, 1964, Ser. No. 357,139
7 Claims. (Cl. 340—173.1)

ABSTRACT OF THE DISCLOSURE

A nondestructive read superconducting memory is described. Bit locations are defined in a continuous superconducting sheet by intersecting access conductors. Limited-amplitude pulses on the access conductors cause transient changes in persistent currents in the selected bit location. Only if the persistent currents are in a first direction does the field associated with that transient change add to the fields associated with the access pulses to drive resistive the adjacent portion of an associated superconducting sense conductor.

This invention relates to information storage circuits, and, more particularly, to information storage circuits employing the phenomenon of superconductivity.

The term "superconductivity" characterizes the ability of certain normally resistive materials to exhibit zero resistance to the flow of an electrical current when cooled to sufficiently low temperatures. The temperature below which zero resistance is exhibited is known as the transition temperature and is characteristic of the particular superconducting material employed. For example, the transition temperature of tantalum is 4.4 degrees Kelvin (° K.), tin 3.7° K., lead 7.2° K., and niobium 9.3° K. In all, there are more than 25 elements in addition to hundreds of alloys and compounds which become superconducting at temperatures ranging between 0 and 18° K. It is contemplated that the circuits described operate in this range and equipment for maintaining a suitable temperature is present. The well known liquid helium cryostat is particularly well adapted for this purpose.

The normal transition temperature of a given superconducting material is lowered in the presence of a magnetic field. If a constant temperature is maintained, a magnetic field exceeding a critical amplitude causes the superconducting material to revert to its normal resistive state. Similarly, currents exceeding a critical amplitude, termed a "critical current," cause the superconducting material to revert to its normal resistive state.

Superconducting materials provide useful memories because first and second binary values may be stored therein as first and second directions of persistent currents. These currents are conveniently stored in a memory plane of a superconductive memory, for example, in a coincident current mode by applying half-select write current pulses to selected row and column conductors coupling the memory plane. The field of the drive currents initially does not penetrate through the superconducting memory plane because opposing supercurrents are generated therein to oppose the change in field. The drive currents, however, are chosen of sufficient amplitude to generate, at selected locations of the memory plane, supercurrents having sufficient amplitudes to drive the superconducting material resistive. Prior to the termination of the write pulse the superconducting state is reestablished and persistent currents are circulating in the superconducting material in a direction determined by the polarity of the pulse. A positive write pulse providing persistent currents in a first direction is taken, arbitrarily, as corresponding to a binary "1." A negative write pulse providing persistent currents in a second direction is taken, arbitrarily, as corresponding to a binary "0." One such superconductive memory is described on pages 427 et seq. of "Large Capacity Memory Techniques for Computing System," edited by M. C. Yovits, published in 1962 by The Macmillan Co.

The read-out operation of such prior art memories depends on selectively driving resistive bit location of a superconducting memory plane. A sense conductor, positioned on the opposite side of the memory plane, is coupled to the row and column conductors through the resistive bit location via the field generated about the row and column conductors during a read cycle of operation. This read-out operation requires that the stored information be destroyed.

The primary object of this invention is to provide a new and novel superconductive memory wherein information can be read out nondestructively.

The invention is based, to a large extent, on the realization that transient changes in the persistent currents stored in a bit location of a superconductive memory plane are accompanied by relatively large and relatively small magnetic fields, respectively, for first and second initial directions of the persistent currents. By associating with the bit locations of such a memory a sense conductor made of a superconducting material which goes resistive under the influence of the relatively large field only, an indication of the presence or absence of persistent currents in the first direction is obtained nondestructively.

The above and further objects of this invention are realized in one emobdiment thereof wherein row and column conductors define a matrix of bit locations in an adjacent memory plane and wherein the memory plane is composed of a superconducting material having a first transition temperature. A sense conductor coupled to all the bit locations in the memory plane is positioned between the row and column conductors and the memory plane. The sense conductor is of a superconducting material having, advantageously, a lower transition temperature than that of the memory plane. Information is stored in the memory by coincident energization of selected row and column conductors during a write cycle of operation. During a read cycle, negative pulses of limited amplitude are applied to selected row and column conductors for causing transient changes in the stored persistent currents. In this connection, the term "limited amplitude" is used herein to characterize a read pulse the rising and trailing edges of which produce exactly opposite changes, herein termed "transient" changes, in the persistent currents in any bit location affected thereby. If the interrogated location contains persistent currents in a first direction, the field at the adjacent portion of the sense conductor becomes sufficiently large, in response to the read pulse, to drive resistive that adjacent portion. This additional resistance in the sense conductor is indicated by applying a direct current to the sense conductor for providing there a voltage drop detected by, for example, a voltage pulse detector also coupled to the sense conductor.

In another embodiment in accordance with this invention there is a separate sense conductor following the path of each of the column conductors. These sense conductors separate the row and column conductors from the memory plane, and also are of a superconducting material, advantageously, having a transition temperature lower than that of the memory plane. Read out is provided by applying a limited-amplitude pulse to one row conductor, and by sensing on a word-organized basis, in accordance with this invention.

Accordingly, a feature of this invention is that a sense conductor is positioned between the memory plane and the row and column conductors.

Another feature of this invention is the provision of read pulses of amplitudes insufficient to drive resistive the selected bit location.

A further feature of this invention is a super-conductive memory including, adjacent to all its bit locations, a sensing means to which a direct current source and a voltage pulse detector are connected.

A still further feature of this invention is a sensing means of a superconducting material portions of which are driven resistive by relatively large magnetic fields. Such large magnetic fields are generated, in accordance with this invention, in response to limited-amplitude read pulses, only when persistent currents in a first direction are stored in the interrogated locations.

The invention and its further objects and features will be understood more fully from the following description rendered in conjunction with the accompanying drawing wherein.

Figure 1:
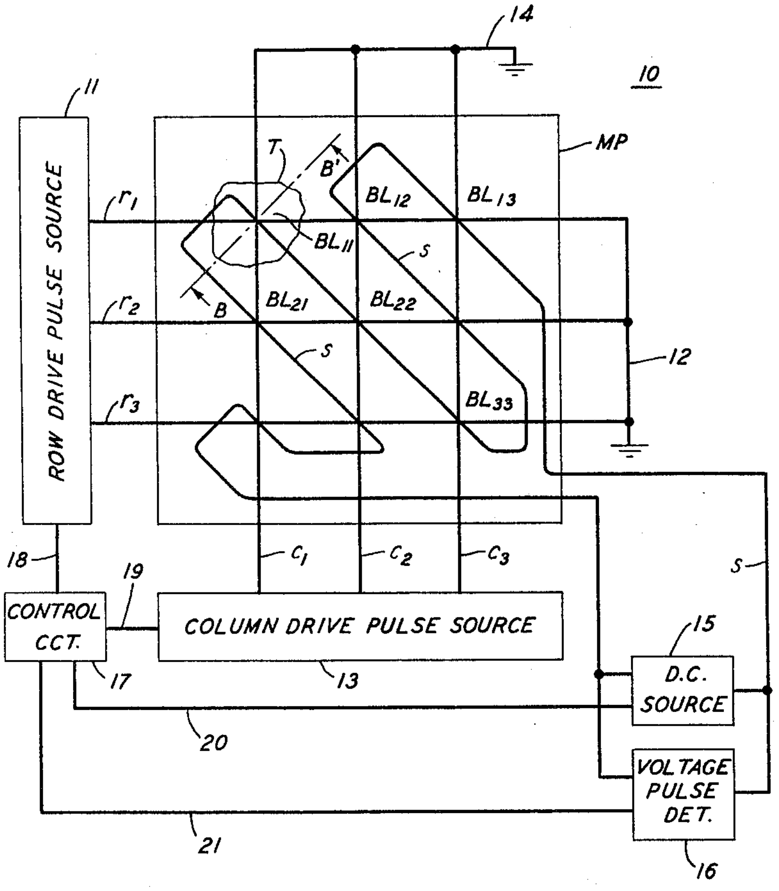
FIG. 1 is a schematic representation of a bit-organized superconductive memory in accordance with this invention.
Figure 4A:
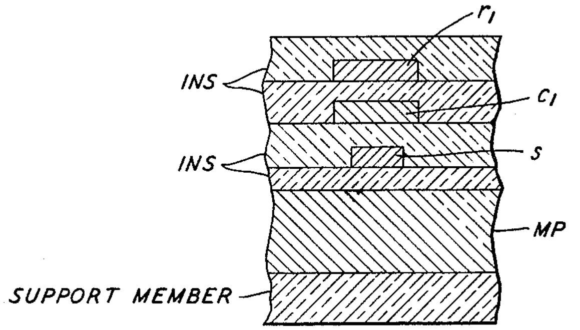
Figures 2, 4B, 5, 7, 9:
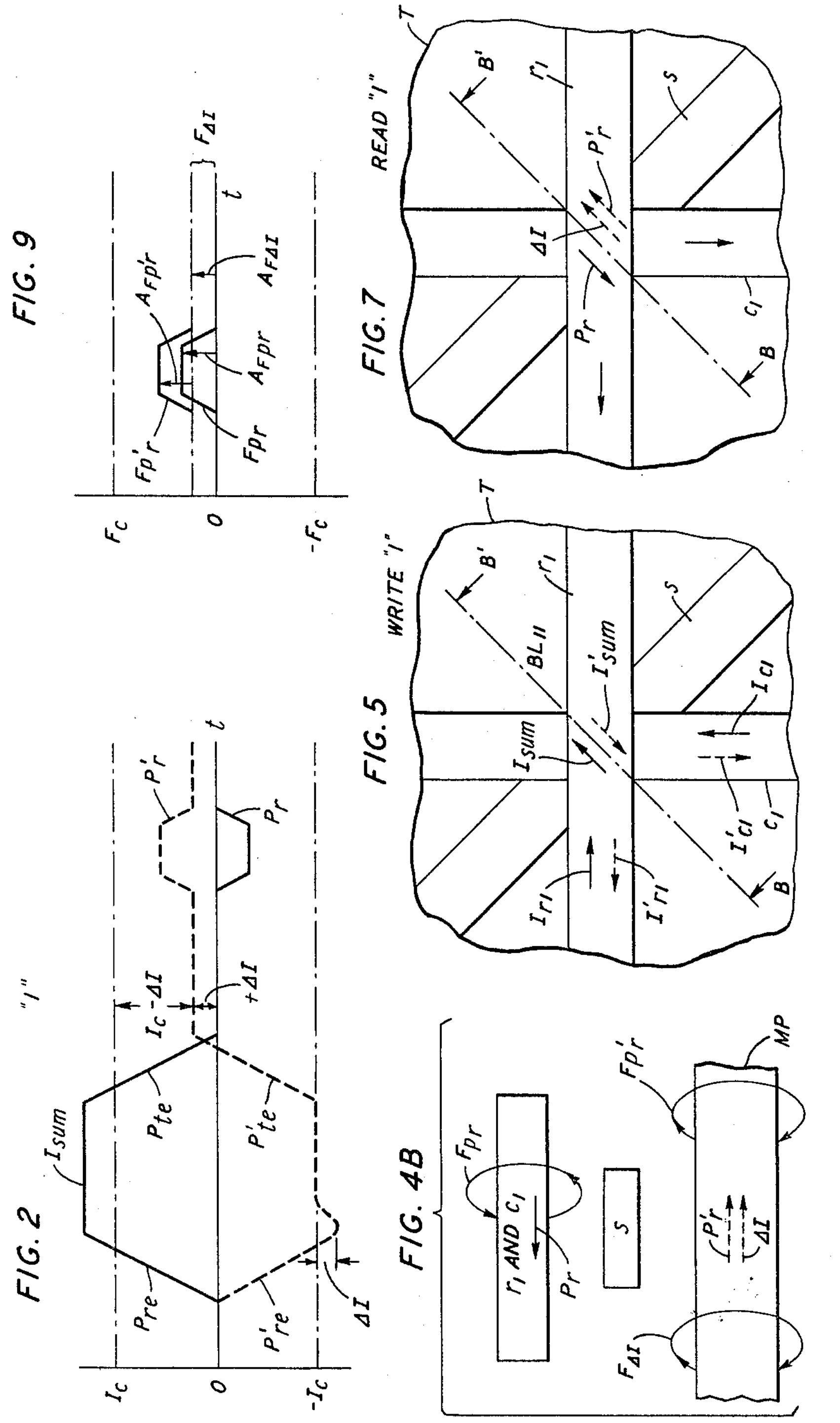
FIGS. 2 and 3 are pulse diagrams illustrating, in connection with the memory of FIG. 1, the current conditions in the access and sense conductors thereof, and in the superconducting material of the memory plane in response to these current conditions.
Figures 3, 4C, 6, 8, 10:
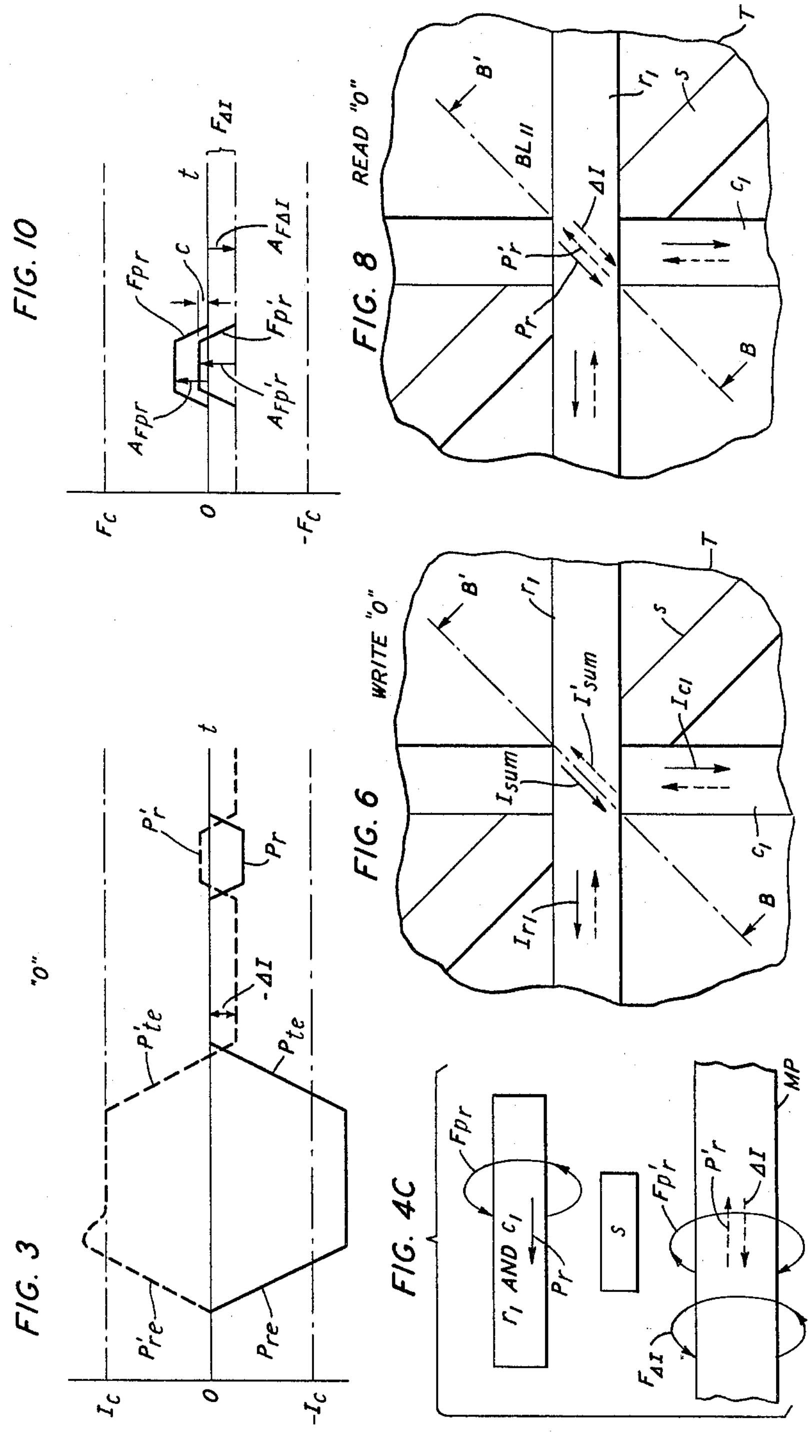
Figure 11:
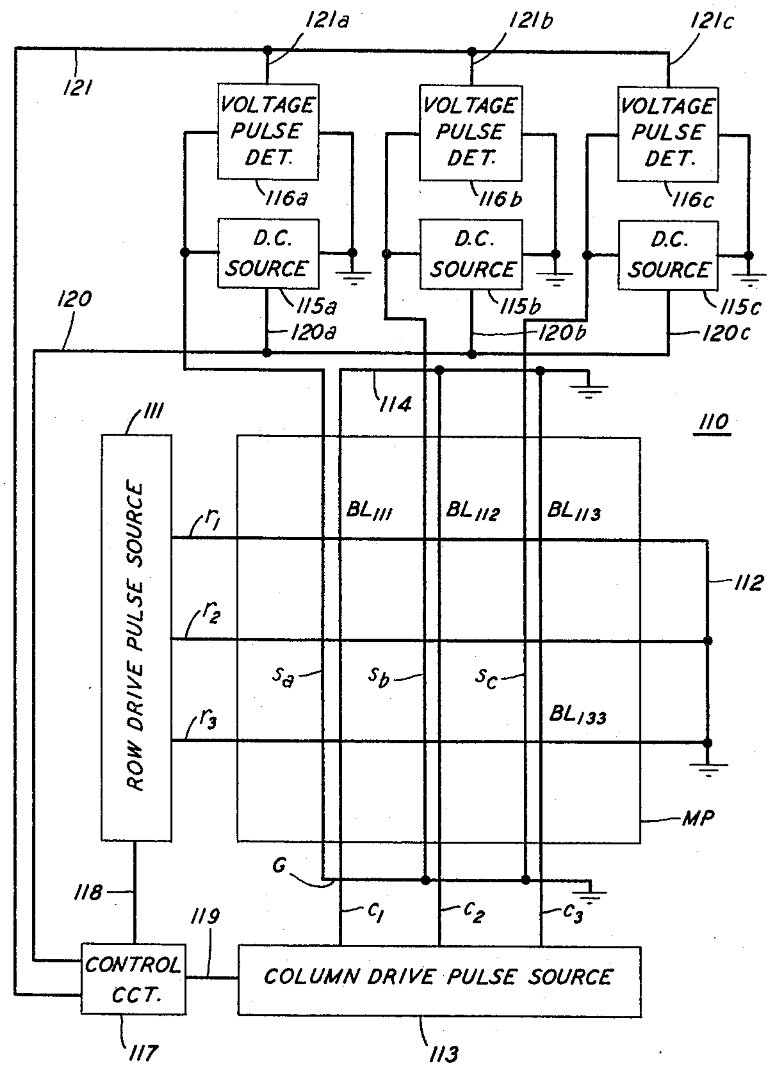

FIGS. 4*a*, 4*b*, and 4*c* are cross-sectional views of a representative bit location of the memory of FIG. 1 illustrating the various currents, and the corresponding magnetic fields thereabout, in accordance with this invention;

FIGS. 5, 6, 7 and 8 are top views of the bit location of FIGS. 4*a*, 4*b*, and 4*c*, illustrating the direction of write-one, write-zero, read-one, and read-zero currents, respectively, in the drive conductors, and the directions of the opposing supercurrents established in the superconducting material of the corresponding bit location;

FIGS. 9 and 10 are pulse diagrams illustrating the magnetic fields accompanying the reversible changes in the stored persistent currents in response to the read pulses; and, FIG. 11 is a schematic representation of a word-organized superconductive memory in accordance with this invention.

It is to be understood that the figures are not necessarily to scale, certain exaggerations having been made therein for illustrative purposes only.

FIG. 1 shows a bit-organized, coincident current memory 10 comprising a superconductive memory plane MP to which access is had via row conductors $r_1$, $r_2$, and $r_3$, and column conductors $c_1$, $c_2$, and $c_3$. Each of the row conductors is connected between row drive pulse source 11 and ground bus 12. Similarly, each of the column conductors is connected between column drive pulse source 13 and ground bus 14. The row and column conductors are positioned generally orthogonal to each other and define at their intersections a matrix of bit locations $BL_{11}$, $BL_{12}$, $BL_{13}$, $BL_{21}$, $BL_{22}$ . . . $BL_{33}$ in the memory plane MP. Although the illustrative memory includes only nine bit locations, it is to be understood that a lesser or greater member of locations may be utilized in accordance with this invention. A sense conductor *s*, coupling each of the bit locations, is connected to a parallel arrangement of a direct current source 15 and voltage pulse detector 16. Row drive pulse source 11, column drive pulse source 13, direct current source 15, and voltage pulse detector 16 are connected to control circuit 17 via conductors 18, 19, 20, and 21, respectively.

Importantly, the sense conductor is positioned between the access conductors and the memory plane; and, in this connection particularly, the present invention is considered a departure from the prior art. This spatial arrangement is shown in FIG. 4*a* which is a cross section of the memory plane MP of the memory 10 of FIG. 1, taken along line B–B′ through the bit location $BL_{11}$.

The figure also illustrates the separation of the access conductors $r_1$ and $c_1$, the sense conductor *s*, and the memory plane MP by insulating material, such as silicon monoxide, designated *ins* in the figure. In addition, the memory plane is typically a thin film of superconducting material usually about 1,000 Angstrom units thick evaporated on an electrically insulating rigid support member. This support member is so designated in FIG. 4*b*.

In accordance with this invention, coincident half-select pulses are applied, for example, to row conductor $r_1$ and column conductor $c_1$ for storing persistent currents in a representative bit location $BL_{11}$. To this end, pulse sources 11 and 13 are any pulse sources capable of energizing the row and column conductors in accordance with this invention. Activation of the pulse sources 11 and 13 is under the control of control circuit 17 which, for this purpose, is any control circuit capable of energizing the pulse sources 11 and 13 in accordance with this invention. For this description, a binary "1" is considered stored when positive half-select pulses are applied. The direction of positive half-select pulses in the drive conductors is outward from the pulse sources as viewed in FIG. 1. This is more clearly illustrated by the arrows $I_{r1}$ and $I_{c1}$ in FIG. 5 which shows enlarged the portion T of FIG. 1 encompassing bit location $BL_{11}$. The two positive "half-select" (in the parlance of coincident current memories) current pulses add vectorially to produce a positive "full-select" pulse $I_{sum}$ directed upward and to the right as viewed in FIG. 5. Opposing these current pulses are supercurrents generated in the memory plane MP at the bit location $BL_{11}$ as is well known. These opposing supercurrents are shown as broken arrows designated $I'_{r1}$, $I'_{c1}$, and $I'_{sum}$ in FIG. 5. The positive full-select pulse $I_{sum}$ which is herein also termed the "write-one" pulse is chosen to be of an amplitude such that resulting supercurrents $I'_{sum}$ drive the superconducting material at the bit location $BL_{11}$ resistive.

The postive full-select or write-one pulse $I_{sum}$ and its effect on the bit location may best be understood with reference to FIG. 2. In FIG. 2, current I of the write-one pulse is plotted against time *t*. The critical currents $\pm I_c$ of the memory plane are denoted as horizontal broken lines. For two positive half-select pulses, the write-one pulse rises from zero to a value exceeding $+I_c$. An opposing supercurrent is generated in the bit location as shown by broken line $P'_{re}$ which designates the rising edge of the opposing supercurrent. The rising edge of the applied pulse is designated $P_{re}$. The supercurrents in superconducting material cannot exceed a critical value $\pm I_c$ which is characteristic of the material without becoming resistive. In the memory plane MP at the selected bit location $BL_{11}$, currents $I_c+\Delta I$ exceeding this critical value, $-I_c$ as shown in FIG. 2, drive that bit location resistive. The currents therein undergo a change in distribution. The excess currents $\Delta I$ redistribute, returning the currents in the superconducting material (also termed supercurrents herein) to the value essentially $-I_c$ as shown in FIG. 2 (ignoring heating effects). The trailing edge $P_{te}$ of the applied write-one pulse decays from the maximum value greater than $I_c$ to zero. The change in the accompanying magnetic field is opposed by changes in the supercurrents as shown by the trailing edge $P'_{te}$. $P'_{te}$, however, decreases from a maximum value of $-I_c$. Accordingly, although the trailing edge $P_{te}$ of the applied write-one pulse terminates at zero, the trailing edge $P'_{te}$ of the supercurrent terminates at a positive value approximately equal to the excess currents $\Delta I$ and is so designated in the figure. These currents are known as persistent currents and manifest themselves as currents in bit location $BL_{11}$ circulating in a positive direction. Hereafter these currents are designated persistent currents in a first direction and correspond to a binary "1".

A binary "0" is stored in a representative bit location $BL_{11}$ by applying two negative half-select pulses to row and column conductors $r_1$ and $c_1$. The half-select pulses again are applied by row drive pulse source 11 and column drive pulse source 13 under the control of control circuit 17. Negative half-select pulses are taken as directed toward the pulse sources as shown by arrows $I_{r1}$ and $I_{c1}$ in FIG. 6. The resulting negative full-select pulse $I_{sum}$, also termed a "write-zero" pulse, can be seen to be directed downward and to the left as shown in the figure. This direction is opposite to that shown for the positive write pulse in FIG. 5.

FIG. 3 illustrates the write-zero pulse and the changes in response thereto. The figure shows a negative-going rising edge $P_{re}$ to the write-zero pulse and a positive-going rising edge to the corresponding supercurrent. There is a direct correspondence between FIG. 3 and FIG. 2. In the latter, however, the write-zero pulse is negative in contradistinction to the positive write-one pulse shown in FIG. 2. In view of this correspondence, it is sufficient to say that at the termination of the trailing edge $P'_{te}$ of the supercurrent opposing the changes in the field of the write-zero pulse, the resulting persistent currents are circulating in a negative direction. The negative direction is designated the second direction herein. Again these persistent currents have a magnitude of approximately $\Delta I$ as is indicated in the figure.

To recapitulate, a binary "1" is stored in a bit location of a superconductive memory by two positive half-select pulses which correspond to persistent currents in a first direction. A binary "0" is stored by two negative half-select pulses which correspond to persistent currents in a second direction. Since this embodiment concerns a coincident current memory wherein storage of information is on a bit-organized basis, it is sufficient to illustrate the storage of a binary "1" and a binary "0" in a representative bit location to illustrate the operation of the entire memory because all bit locations therein store information alike.

Such is also the case with the read operation which, accordingly, is now discussed for reading a "1" and a "0" out of the representative bit location $BL_{11}$. In accordance with this invention, read out of bit location $BL_{11}$ is accomplished by applying a negative pulse to each of row conductor $r_1$ and column conductor $c_1$. Again, these pulses are applied simultaneously by the activation of row drive pulse source 11 and column drive pulse source 13 under the control of control circuit 17. These pulses are selected of an amplitude to produce a read pulse, designated $P_r$ in FIG. 2, which is insufficient to drive the superconducting material of the memory plane resistive. Accordingly, the read pulse is limited to a value less than $I_c - \Delta I$. This limitation is most easily understood with reference to FIG. 2 which shows that the supercurrent $P'_r$, opposing the field generated by the read pulse $P_r$, adds to the existing persistent currents $+\Delta I$ in a first direction. If $P'_r$ and $+\Delta I$ exceed $I_c$, the superconducting memory plane goes resistive at that bit location. This is to be avoided, in accordance with this invention, and, in this connection too, the invention is considered to be a further departure from the prior art. Were the read pulse sufficient to cause supercurrents exceeding $I_c$, stored information would be destroyed in accordance with the prior art. A main advantage of this invention is that information is read nondestructively.

Let us recall that a sense conductor separates the row and column conductors from the memory plane as shown in FIG. 4*a*. This arrangement is also shown in FIG. 4*b* which is quite similar to FIG. 4*a*. Since insulating materials and their use in the context of superconductive memories are well understood and do not constitute a part of this invention, FIG. 4*b* omits the insulators and shows only the relative positions of the operative elements for the discussion to follow. Similarly, discussion of deposition techniques for the fabrication of the operative elements and the insulators therebetween is omitted. FIG. 4*b* also, for simplification, shows the $r_1$ and $c_1$ conductors as a composite conductor labeled $r_1$ and $c_1$. Further, the support member, so designated in FIG. 4*a*, is also omitted from FIG. 4*b*.

The field $F_{pr}$ generated by the read pulse $P_r$ plus the field $P'_r$ generated by the supercurrent $P'_r$ add at the intermediate sense conductor to drive resistive that portion of the sense conductor. This relationship is illustrated in FIG. 9 which is aligned with FIG. 2 for easy comparison, and in FIGS. 4*b* and 7. It may be noted that $F_c$, shown in FIG. 9 as a horizontal broken line, corresponds to $I_c$ of FIG. 2 and designates the field at the surface of the memory plane, facing the access conductors, when the current $I_c$ flows through the memory plane at the selected bit location. Similarly, $-F_c$ corresponds to $-I_c$. As shown in FIG. 9, the field $F_{pr}$ due to the read pulse $P_r$ rises from zero to a maximum and returns to zero following the general shape of the read pulse; the field $F_{p'r}$ due to the supercurrent $P'_r$ follows the shape of the latter. The bit location already had thereabout a field $F_{\Delta I}$ due to the persistent currents in the first direction there. The amplitudes of these three fields, represented by vertical arrows in FIG. 9 designated $A_{Fpr}$, $A_{Fp'r}$, and $A_{F\Delta I}$, respectively, add at the sense conductor to apply there a total maximum amplitude which exceeds the critical field for the superconducting material of the sense conductor at that portion of the sense conductor. The supercurrent $P'_r$ and the persistent current $\Delta I$ as well as the fields generated thereby are discussed as distinct currents and fields for purposes of illustration. Actually, only one current flows in the bit location and only one field is generated thereby as is well known. That the fields do add at the sense conductor can be appreciated with reference to FIGS. 4*b* and 7. It is noted that FIG. 4*b*, as FIG. 4*a*, represents a cross section taken along line B–B′ of FIG. 1. Accordingly, the read pulse $P_r$ and the persistent currents $\Delta I$, shown by the arrow and the broken arrow, respectively, so designated in FIG. 7, have fields $F_{pr}$ and $F_{\Delta I}$ in directions according to the right-hand rule as shown in FIG. 4*b* by curved arrows so designated. Similarly, the supercurrent $P'_r$ shown in FIG. 7 as a broken arrow designated $P'_r$ generates a magnetic field $F_{p'r}$ in the direction of field $F_{\Delta I}$. The amplitude of the field at the intermediate sense conductor can, thus, be seen to be the sum of all the fields. This result corresponds to the directions of the arrows in FIG. 7, the arrows $P'_r$ and $\Delta I$ being directed upward and to the right, the arrow $P_r$ being directed downward and to the left as viewed in that figure. Thus, the memory plane remains superconducting, preserving the information stored there, and the corresponding portion of the sense conductor is driven resistive. A direct current applied, via direct current source 15, to the sense conductor, advantageously, indicates the resistive portion thereof as a voltage pulse which is detected by voltage pulse detector 16. In this connection, both the direct current source 15 and the voltage pulse detector 16 are activated under the control of control circuit 17. Direct current source 15 may be any direct current source capable of supplying direct current in accordance with this invention. Voltage pulse detector 16 may be any utilization circuit capable of operating on the voltage pulse output in accordance with this invention.

The read out of a stored "0" is quite similar to that of a stored "1" except that the amplitude of the magnetic field, in this case, is insufficient to drive resistive the coupled portion of the sense conductor.

FIG. 10 shows the magnetic fields $F_{pr}$, $F_{\Delta I}$, and $F_{p'r}$ generated by the read pulse $P_r$, the persistent currents $-\Delta I$, and the supercurrent $P'_r$, respectively; the amplitudes thereof are designated $A_{Fpr}$, $A_{F\Delta I}$, and $A_{p'r}$. The supercurrent $P'_r$ generated in opposition to the field of the read pulse $P_r$ opposes the persistent currents $-\Delta I$ when a zero is stored in the interrogated location. This is shown in FIG. 8 by the oppositely directed broken arrows P′r and $\Delta I$. Accordingly, the field $F_{p'r}$ generated by the supercurrent $P'_r$ opposes the field $F_{\Delta I}$ generated by the persistent current $\Delta I$ as shown in FIG. 4*c*. Only when the field $F_{p'r}$ exceeds the field $F_{\Delta I}$ does the magnitude of the former contribute to the field at the sense conductor. This contribution is labeled $c$ in FIG. 10. The amplitude of the field at the sense conductor when a "0" is read, then, is $c$ plus the amplitude $A_{Fpr}$ of the field $F_{pr}$ generated by the applied read pulse $P_r$. This amplitude is insufficient to drive the sense conductor resistive.

Thus, it can be seen that, as described, the voltage pulse detector 16 detects a negative voltage pulse for the read out of a stored "1" and a null for the read out of a stored "0".

It has been stated herein that the superconducting material of a sense conductor, in accordance with this invention, advantageously has a transition temperature less than that of the memory plane. This selection of relative transition temperatures permits relatively low amplitude read pulses to be utilized. The amplitude of the read pulse may, advantageously, be made sufficiently low that the value of $c$ by which the field $F_{p'r}$ exceeds the field $F_{\Delta I}$, as shown in FIG. 10, approaches zero. In practice, the read pulse is chosen so that its field $F_{p'r}$ is less than the field $F_{\Delta I}$, typically one-half thereof. This, in turn, permits a reduction in the amplitude of the field at the sense conductor when a "0" is read out.

In addition, the relatively low transition temperature of the superconducting material of the sense conductor with respect to that of the memory plane indicates that the portion of the sense conductor adjacent a selected bit location goes resistive during the write cycle of operation. Such operation is permissible because read out is avoided, that is to say, that the voltage pulse detector is deactivated, during the write cycle, by conventional strobe equipment which is part of control circuit 17. On the other hand, the superconducting material of the sense conductor may be of a higher transition temperature than that of the memory plane to avoid driving the former resistive during the write cycle of operation. In this case, the direct current applied to the sense conductor during the read cycle of operation is relatively high for decreasing the effective transition temperature of the material of the sense conductor as is well known. The row and column conductors are of superconducting materials characterized by relatively high transition temperatures and remain superconducting during normal operation in accordance with this invention. In one specific bit-organized memory, the memory plane is of tin, the row and column conductors are of lead, and the sense conductor is of a tin-indium alloy.

As is typical of coincident current write memories, many bit locations are affected by one half-select pulse. This is the case also when coincident half-select currents are used to write information into a superconductive memory in accordance with this invention. A half-select pulse, however, is insufficient, in accordance with this invention, to drive resistive any bit location of the memory. Accordingly, no persistent currents are stored in half-selected bit locations during the write cycle of operation. Similarly, during the read cycle of operation, many bit locations are "interrogated" by one of the two pulses which interrogate the selected bit location. Even though the applied pulse and the opposing supercurrent generated thereby in these bit locations are accompanied by fields which do add at the sense conductors there, the resulting fields are insufficient to cause the corresponding portions of the sense conductor to become resistive. Thus, the contributions from these bit locations are negligible.

Also, it may be noticed that the sense conductor of FIG. 1 is positioned such that any currents induced therein by the changes in any of the fields discussed hereinbefore are directed about the surface of the sense conductor. Accordingly, any currents induced in the sense conductor are localized about the sense conductor in the area in which they are induced. Actually, the sense conductor could be oriented to pass each bit location along a line orthogonal to the discussed orientation, in accordance with this invention. The induced currents are localized in that case also.

Further, it may be noted that the row and column conductors of, for example, FIG. 1 are oriented generally orthogonal to each other. This is the conventional arrangement and is used herein only for illustrative purposes. The row and column conductors may be transverse to each other or, alternatively, need not intersect at the bit locations as long as writing and reading are accomplished in accordance with this invention.

Although the invention has been described in terms of a coincident current, bit-organized memory, it is contemplated that the invention can be practiced in the context of a word-organized memory.

FIG. 11 illustrates a word-organized memory in accordance with this invention. Inasmuch as the word-organized memory is similar to the coincident current memory of FIG. 1, corresponding numeral designations are used. The word-organized memory 110 comprises a memory plane MP to which access is had via row conductors $r_1$, $r_2$, and $r_3$, and column conductors $c_1$, $c_2$, and $c_3$, which define nine bit locations $BL_{111}$ . . . $BL_{133}$. Here too, a fewer or greater number of bit locations can be used in accordance with this invention. Each of the row conductors is connected between row drive pulse source 111 and ground bus 112. Each of the column conductors is connected between column drive pulse source 113 and ground bus 114. Each of a plurality of sense conductors S$a$, S$b$, and S$c$, generally oriented in the same manner as the column conductors, is connected at the first end to a parallel arrangement of a direct current source 115 and a voltage pulse detector 116, and at the other end to ground bus G, the current sources and the voltage pulse detectors each bearing subscripts corresponding to those of the sense conductor to which it is connected. Control circuit 117 is connected to row drive pulse source 111, column drive pulse source 113, direct current source 115, and voltage pulse detector 116 via conductors 118, 119, 120, and 121, respectively, each tap to the individual direct current source or voltage pulse detector bearing subscripts corresponding to those of the direct current source or voltage pulse detector to which it is connected.

Since the memory 110 is word organized, the storing and reading of representative word 101 will be discussed. In accordance with this representative word, negative half-select pulses are applied to, for example, row conductor $r_1$ and column conductors $c_1$, $c_2$, and $c_3$ for writing a binary "0" into representative bit locations $BL_{111}$, $BL_{112}$, and $BL_{113}$. These half-select pulses are applied via row and column drive pulse sources 111 and 115 under the control of control circuit 117. In this connection, row and column drive pulse sources 111 and 115 are any sources capable of supplying pulses in accordance with this invention. Control circuit 117 is any control circuit capable of controlling the drive pulse sources 111 and 113, the direct current source 115, and the voltage pulse detector 116 in accordance with this invention. Thereafter, positive half-select pulses are applied to row conductor $r_1$ and to column conductors $c_1$ and $c_3$ to write a "1" in bit locations $BL_{11}$ and $BL_{13}$ in accordance with the assumed representative word.

During a read cycle of operation, a negative, limited-amplitude read pulse is applied to the row conductor $r_1$ via row drive pulse source 111 under the control of control circuit 117. This read pulse is insufficient in amplitude to drive resistive the superconducting material of any of the bit locations $BL_{111}$, $BL_{112}$, $BL_{113}$. In each of the locations $BL_{111}$ and $BL_{113}$, a binary "1" is stored as positive persistent currents. These currents are accompanied by a magnetic field which, in accordance with the right-hand rule, as discussed in connection with FIG. 4$b$, adds to the fields generated by the negative read pulse in row conductor $r_1$ and the opposing supercurrent in the bit locations. Accordingly, during the read cycle of operation, those portions of the sense conductors adjacent these bit locations are driven resistive, in accordance with this invention, and voltage pulses are detected in voltage pulse detectors **116*a* and 116*c* activated during the read cycle of operation under the control of control circuit 117**.

A zero is stored in bit location $BL_{112}$. Thus, the persistent currents therein have associated therewith a field which adds to the field of the read pulse in the manner described in connection with FIG. 4*c*. Accordingly, voltage pulse detector 116 detects a null, during the read cycle, for location $BL_{112}$. In this connection voltage pulse detector 116 is any utilization circuit which can accommodate the parallel voltage pulse output of the word-organized memory in accordance with this invention. A complete discussion of the proposed mechanism for operation of the word-organized memory in accordance with this invention is quite similar to that discussed in connection with the bit-organized memory. Accordingly, a detailed discussion of that mechanism at this point is considered unnecessary.

It is to be understood that the specific embodiments of this invention described herein are merely illustrative and that numerous other arrangements according to the principles of this invention may be devised by one skilled in the art without departing from the spirit and scope of this invention.

What is claimed is:

1. In a superconductive memory employing a continuous superconductive memory plane and access means associated with said memory plane for storing information in bit locations therein as persistent currents of first and second directions, means for nondestructively detecting the direction of said persistent currents, said means comprising superconductive sensing means coupled to said bit locations, said sensing means being of a superconducting material such that the magnetic field at each selected bit location is sufficient to drive resistive the corresponding portion of the sensing means when persistent currents only in said first direction therein are changed by limited-amplitude read pulses, means connected to said access means for selectively applying thereto limited amplitude read pulses, and means connected to said sensing means for detecting said resistive portions therein.

2. In a superconductive memory employing a continuous superconductive memory plane and row and column conductors for storing in associated bit locations of that memory plane, when energized in pairs, persistent currents of first and second directions, means for nondestructively detecting the direction of said persistent currents, said means comprising a superconductive sense conductor between said row and column conductors and said memory plane, said sense conductor being of a superconducting material such that a magnetic field at a selected bit location is sufficient to drive resistive the adjacent portion of the sense conductor when persistent currents only in said first direction therein are changed by a limited amplitude read pulse, means connected to said row and column conductors for selectively applying thereto limited amplitude read pulses, means connected to said sense conductor for applying a direct current thereto, and means connected to said sense conductor for detecting voltage pulses therein.

3. In a superconductive memory in accordance with claim 2 wherein said sense conductor is of a superconducting material having a transition temperature lower than that of said memory plane.

4. In a superconductive memory in accordance with claim 2 wherein said sense conductor is composed of a tin indium alloy and said memory plane is composed of tin.

5. In a superconductive memory employing a continuous superconductive memory plane and row and column conductors for storing in associated bit locations of that memory plane, when energized in pairs, persistent currents of first and second directions, means associated with said bit locations for nondestructively detecting the direction of said persistent currents, said means comprising a plurality of superconducting sense conductors being arranged between said row and column conductors and said memory plane, said sense conductors being of a superconducting material such that a magnetic field at each selected bit location is sufficient to drive resistive the adjacent portion of the associated sense conductor when persistent currents only in said first direction therein are changed by limited-amplitude read pulses, means connected to said row conductors for selectively applying thereto limited-amplitude read pulses, means connected to said sense conductors for applying direct currents thereto, and means connected to said sense conductors for detecting voltage pulses therein.

6. In a superconductive memory in accordance with claim 5 wherein said sense conductors are composed of a superconducting material having a lower transition temperature than that of said memory plane.

7. A superconductive memory employing a continuous superconductive memory plane, access means associated with said memory plane for storing information therein as persistent currents of first and second direction, means for nondestructively detecting the direction of said persistent currents, said means comprising superconductive sensing means coupled to said bit locations, said sensing means being of a superconducting material such that the magnetic field at each selected bit location is sufficient to drive resistive the corresponding portion of the sensing means when persistent currents only in said first direction therein are changed by limited-amplitude read pulses, means connected to said access means for applying thereto limited amplitude read pulses, means connected to said sensing means for applying a direct current thereto, and means connected to said sensing means for detecting voltage pulses therein.

References Cited

UNITED STATES PATENTS 3,181,126 4/1965 Green ------------ 340—173.1

TERRELL W. FEARS, *Primary Examiner.*